Nov. 26, 1963    J. R. GOODWIN    3,111,716
EDGE-BEAD FORMER FOR THERMOPLASTIC SHEETS
Filed May 21, 1962    4 Sheets-Sheet 1
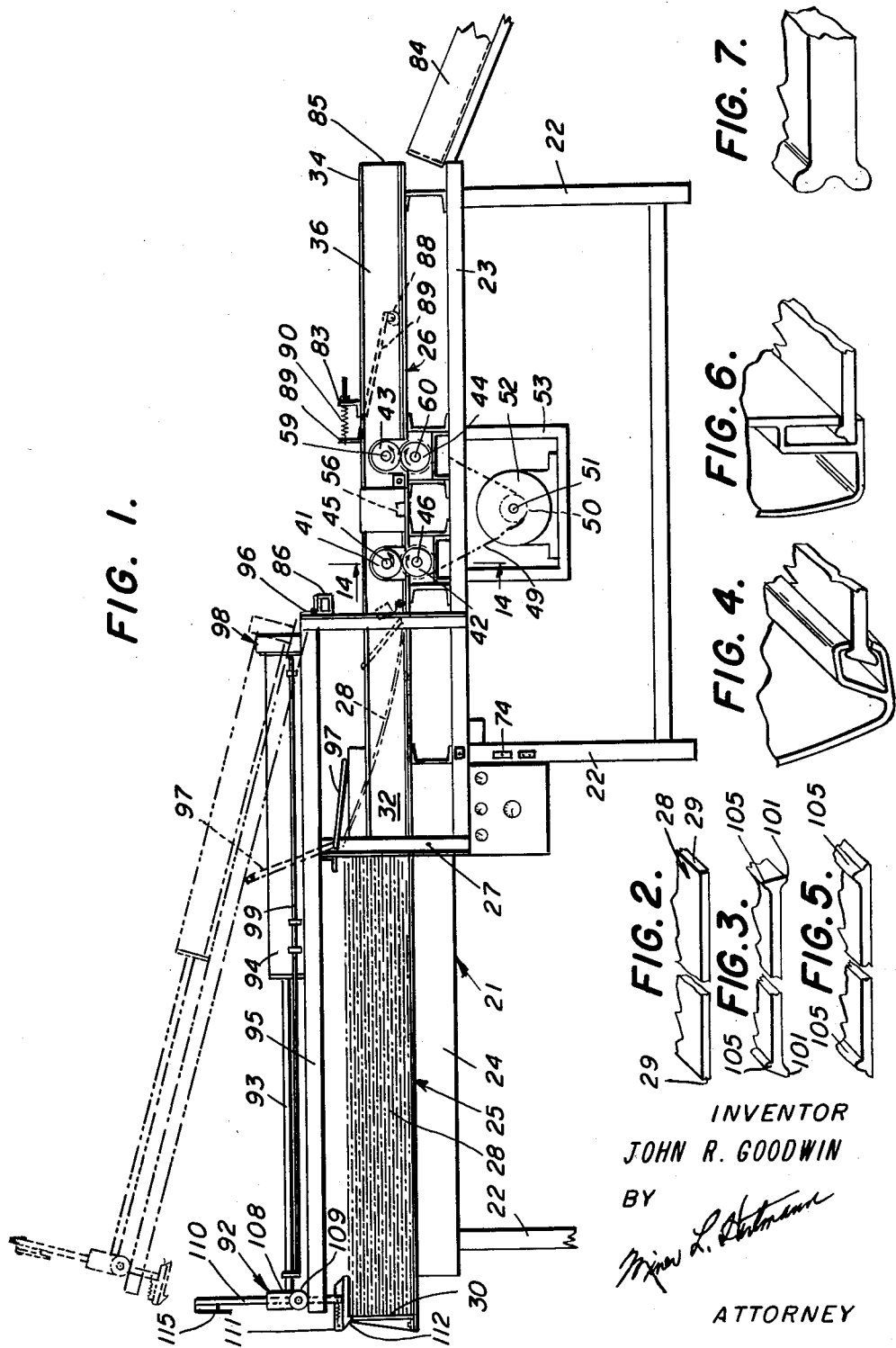
INVENTOR
JOHN R. GOODWIN
BY
ATTORNEY

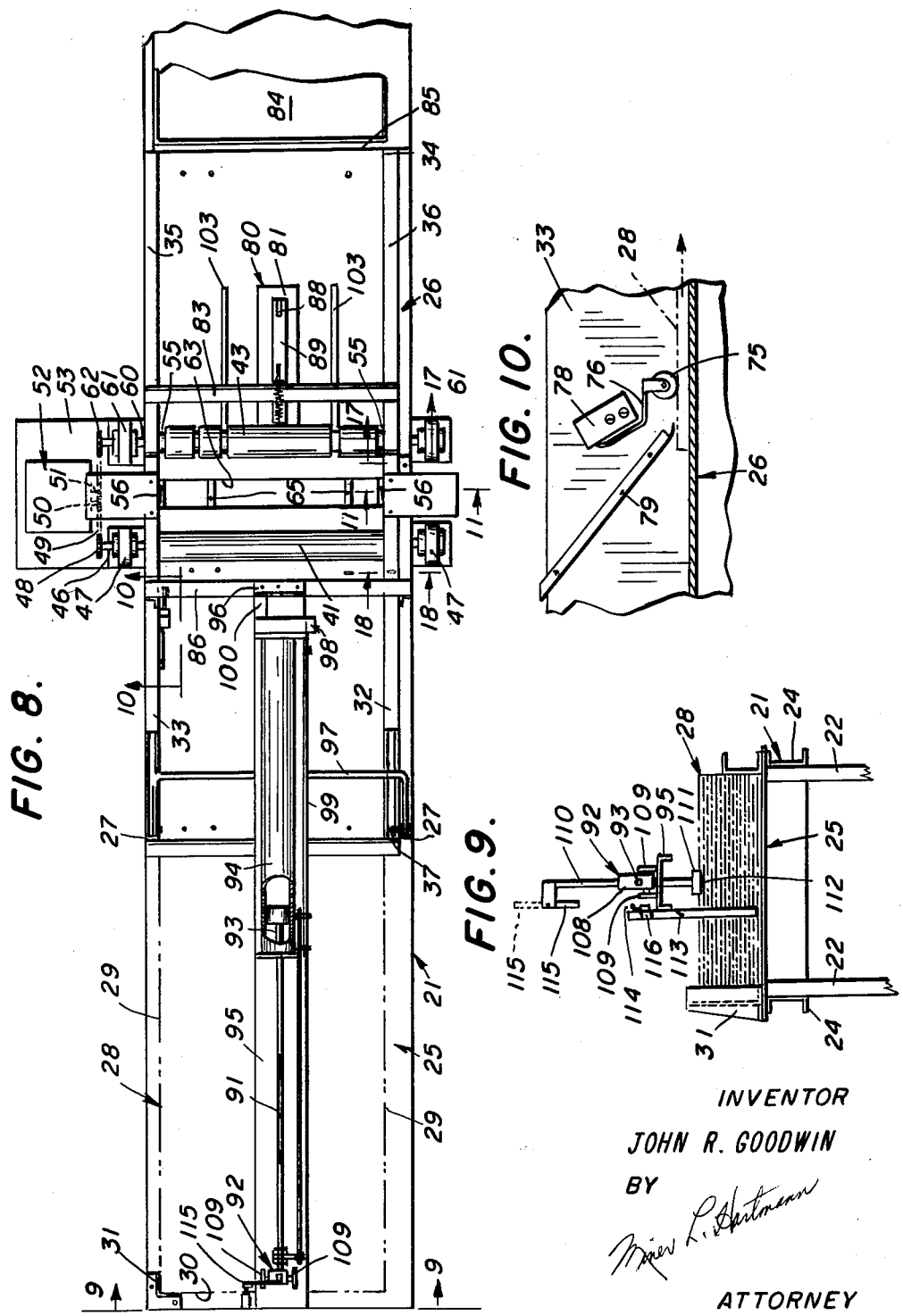

Nov. 26, 1963 J. R. GOODWIN 3,111,716
EDGE-BEAD FORMER FOR THERMOPLASTIC SHEETS
Filed May 21, 1962 4 Sheets-Sheet 3

INVENTOR
JOHN R. GOODWIN
BY
ATTORNEY

Nov. 26, 1963  J. R. GOODWIN  3,111,716
EDGE-BEAD FORMER FOR THERMOPLASTIC SHEETS
Filed May 21, 1962  4 Sheets-Sheet 4

INVENTOR
JOHN R. GOODWIN
BY
*Myer R. Hartmann*
ATTORNEY

3,111,716
Patented Nov. 26, 1963

3,111,716
EDGE-BEAD FORMER FOR THERMO-PLASTIC SHEETS
John R. Goodwin, Pasadena, Calif., assignor to Sunbeam Lighting Company, Los Angeles, Calif., a limited partnership
Filed May 21, 1962, Ser. No. 196,064
8 Claims. (Cl. 18—19)

This invention relates to a machine for forming a shaped bead on the edge or edge portions of rigid rectangular thermoplastic sheets. Another object is to provide an automatic feed mechanism for a bead former for the edges of thermoplastic sheets. A further object is to provide a combined feed mechanism and edge bead former for thermoplastic sheets. Other objects include the automatic forming of dual beads or single beads on one side only, or of specially shaped die formed beads on the edges of rectangular thermoplastic diffuser sheets for light fixtures.

These and other objects are attained by my invention, which will be understood from the following description, reference being made to the accompanying drawings, in which:

FIG. 1 is a side elevational view of a machine following my invention;

FIG. 2 is a fragmentary perspective view of a thermoplastic sheet showing the saw cut-edges of the feed material going into the bead forming machine;

FIG. 3 is a fragmentary perspective view showing one form of dual edge bead which may be produced by the machine;

FIG. 4 is a perspective view showing the cooperation of the edge bead of FIG. 3 with the shaped channel of the holding member for the thermoplastic diffuser sheets used in the construction of fluorescent light fixtures;

FIG. 5 is a fragmentary perspective view of another form of bead which may be produced on the machine;

FIG. 6 is a fragmentary perspective view of the bead shown in FIG. 5 and the manner of engagement between the plastic sheet and a diffuser holding member of a fluorescent lamp fixture;

FIG. 7 is a fragmentary view of still another form of double bead which may be formed by the use of special dies by the machine;

FIG. 8 is a plan view of the machine shown in FIG. 1;

FIG. 9 is an end elevational view taken from the feed end as indicated by the line 9—9 of FIG. 8;

FIG. 10 is an enlarged fragmentary elevation view from the position of line 10—10 of FIG. 8 of a lever operated control switch positioned as shown on FIG. 1;

Figure 11:
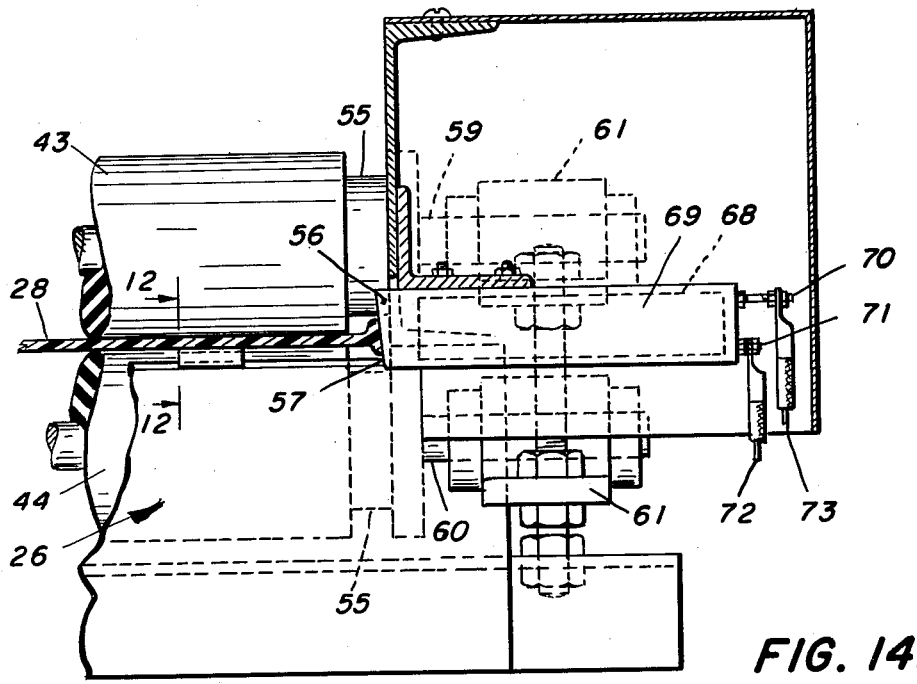
FIG. 11 is a fragmentary cross-sectional view taken on the line 11—11 of FIG. 8.
Figure 12:
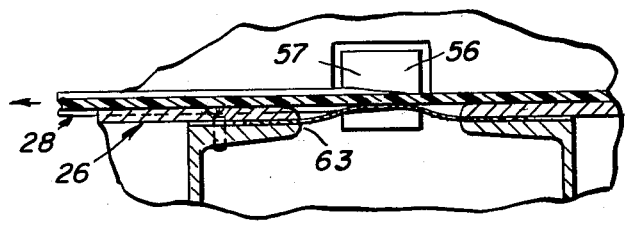
FIG. 12 is a fragmentary cross-sectional view taken on the line 12—12 of FIG. 11.
Figure 14:
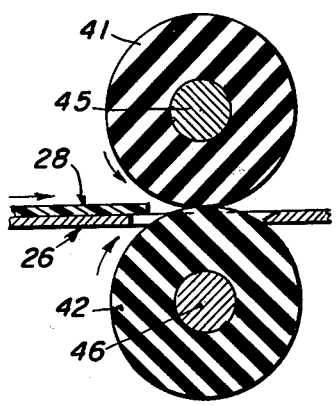
FIG. 14 is a fragmentary cross-sectional view taken on the line 14—14 of FIG. 1.
Figure 13:
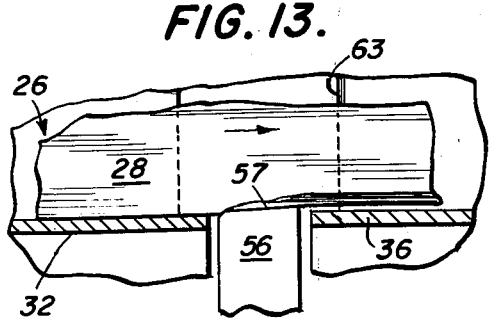
FIG. 13 is a fragmentary plan view and section taken through the bead forming heater.
Figure 15:
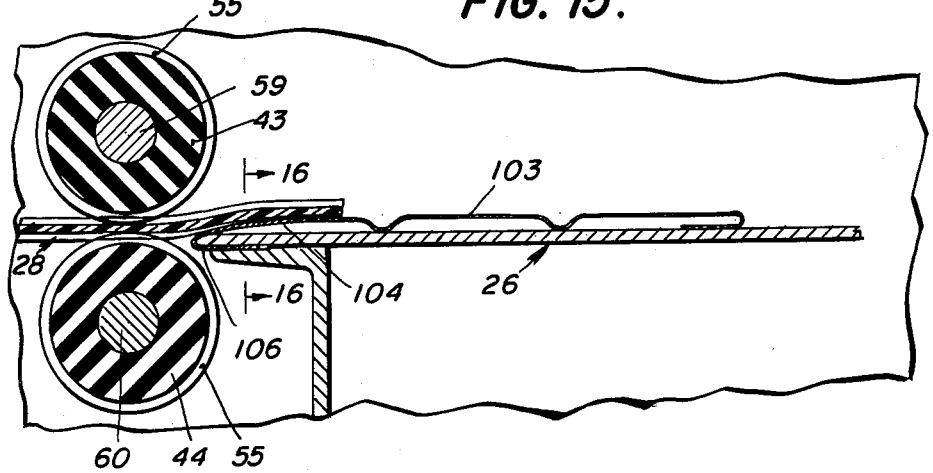
FIG. 15 is a fragmentary cross-sectional view taken on the line 15—15 of FIG. 1.
Figure 16:
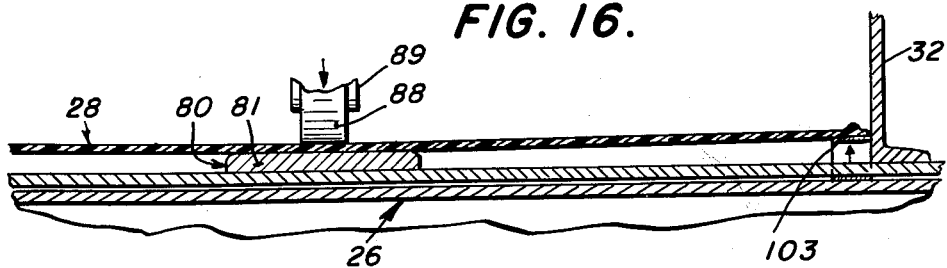
FIG. 16 is a fragmentary cross-sectional view taken on the line 16—16 of FIG. 1.

One form of the edge bead forming machine illustrative of my invention consists of a supporting frame 21 having legs 22, longitudinal horizontal frame members 23 and transverse horizontal channels 24 upon which is supported a feed table 25 extending end-to-end with a work table 26. The feed table 25 is arranged to support a stack of plastic sheets 28 whose side edges 29 are to be shaped into beads by the machine. An end squaring block 31 abuts the end edges 30 of the rectangular plastic sheets, which are also aligned by an adjustable side aligning block 32 on one side and a fixed side aligning block 33 on the opposite side. Automatic means for successively feeding the top sheet into the edge forming machine will be described in detail later.

Figures 17, 18:
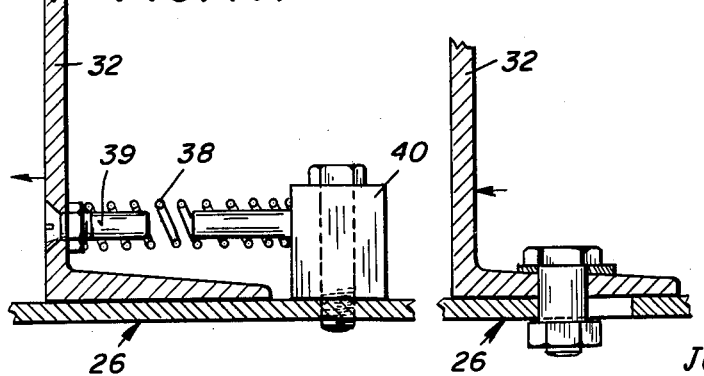
FIG. 17 is a fragmentary cross-sectional view taken on the line 17—17 of FIG. 8.
FIG. 18 is a fragmentary cross-sectional view taken on the line 18—18 of FIG. 8.

The work table 26 extends from the feed table 25 to a discharge end 34. A fixed side guide 33 is provided on one side of the work table 26 and a movable side guide 32 is provided on the opposite side, this latter being attached near the feed end by a vertical pivot 37 and having the other end (between the feed rollers and the pull rollers) spring loaded (as shown in FIG. 17) by a coil spring 38 on a spring pin 39 abutting a member 40 bolted to the work table 26.

A pair of compressible feed rollers 41 and 42 is provided, one above the other, each roller being mounted on a shaft 45 and 46, in bearing members 47. The shaft 46 of the lower roller is provided with a sprocket 48 which is driven by a chain 49 actuated by a drive sprocket 50 attached to the shaft 51 of the motor 52 which is supported on a bracket 53 below the longitudinal frame members 23. The shafts 45 and 46 are disposed in elevation so that a work sheet of plastic 28 resting on the surface of the work table 26 will pass between the rollers 41 and 42, which are made of compressible material such as sponge rubber or the like, and strongly engage the plastic sheet to feed it through the forming dies 56. Another pair of compressible pulling rollers 43 and 44 is provided across the central portion of the work table in a similar position to the compressible feed rollers 41 and 42 located on the down stream side of the forming dies 56. The compressible pulling rollers 43 and 44 are mounted on shaft 59 for the upper roller and shaft 60 for the lower roller in bearing members 61 mounted on the longitudinal frame members 23. The shaft 60 of the lower roller is provided with a sprocket 62 which is also driven by the chain 49 which engages the drive sprocket 50 of the motor 52. The pulling rollers 43 and 44 are also made of compressible material such as sponge rubber or the like and the two rollers are disposed above and below the work table 26 in position to receive between them the plastic sheet after its edges have passed through the forming dies 56. The pull rollers 43 and 44 are provided with end relief spaces 55 at their ends to avoid contacting the edge beads which are formed.

The work table 26 between the two pairs of rollers is provided with a gap or opening 63 extending across the work table 26. A plastic sheet 28, in passing over the gap in the work table, is supported on longitudinally disposed spring strips 65 which are mounted adjacent the sheet edges on the underside of the work table 26 and are bowed upwardly to raise the plastic sheet edges so that each edge is pressed against the opposed heated surfaces 57 of the forming dies 56 on the opposite sides of the table.

The forming dies 56 may be of any desired surface contour to produce the desired bead on the edges of the plastic sheet. As shown, the forming die 56 has a plane surface 57 sloping slightly inwardly (toward the center line of the work table) from bottom to top (as shown particularly in FIG. 11). The die surface 57 is heated by electric heating elements 68 enclosed within the body 69 of the forming die 56, there being electric terminals 70 and 71 with flexible electric leads 72 and 73 which are operatively connected to a control switch 74 attached to the frame 21.

A pad 80 is provided on the work table down stream from the pulling rollers 43 and 44, this pad consisting of a raised area such as a bar 81 which is mounted on the work table 26. The pad 80 is disposed on the work table along its longitudinal center line and is intended to raise the center of the plastic sheet to thereby support the sheet off the work table so that the dual bead which has been formed and may still be somewhat soft is not deformed by the weight of the sheet moving along on the work table edges.

A hold down roller 88 presses down on the center portion of the sheet as it passes over the pad 80, this roller being mounted on the lever arm 89 which is mounted on a transverse channel member 83 and is pressed down by the spring 90.

The finished sheet is pushed forward by the on-coming sheet which is passing through the forming dies and through the two pairs of rollers and the finished sheet is automatically loaded into an open shipping carton 84 placed at the end 85 of the work table.

The sheet feeding device 92 consists of an elongated rod 93 and cylinder 94 mounted on a slotted supporting arm 95 which is attached by hinge means 96 near the down-stream end of the feed table to a transverse horizontal member 86. The supporting arm 95 may at times be held up in a raised inoperative position by a tubular brace 97 pivotally attached to the vertical frame members 27. A reversing valve mechanism 98 is actuated by the valve rod 99 operatively connected to the piston rod 93, so that the piston rod 93 when it reaches the end of its stroke in either direction reverses the actuating fluid in the cylinder, subject to a solenoid operated line valve 100 in the fluid line, disposed adjacent the hinge end of the cylinder 94. The solenoid valve 100 is controlled by the limit switch 78 which is actuated by the arm 76 which is attached to the side guide 33 when the trailing end of a sheet of plastic passing through the feed rollers allows a feeler roller 75 and its arm 76 to drop down to the feed table, to actuate the limit switch 78. A guide strip 79 on the side guide 33 directs the plastic sheet to the work table 26 and under the feeder roller 75.

The outer end of the piston rod 93 is attached to a feeder body 108 which is provided with casters 109 which roll on the sides of the arm 95 which has an elongated central slot 91 through which the vertical rod 110 may move to carry the attached foot 111 from one end of the stack of sheets to the other. The attached foot 111 is pivoted to the vertical rod 110 and is provided with a lip 112 which engages the rear edge of the top sheet 28 of the stack. For purposes of alarm to the operator, an adjustable limit switch mounting rod 113 holds the limit switch 114 for actuation by the actuator 115 which is manually rotatable to either of two positions, whereby an alarm device 116 is operated when a selected number of sheets has been moved off the stack.

When a bead such as shown in FIG. 5 is desired, the bead of FIG. 3 is first formed by the sloping heated die as above described, following which the lower lip or bead 101 is straightened out while the plastic material is still pliable, by providing re-forming strips 103 on the edges of the work table down-stream from the pulling rollers 43 and 44, said strips being bowed upwardly as at 104 to flatten out the lower bead lip 101, thus leaving only the upper lip 105. The strips 103 are conveniently attached to the work table by a reverse bend 106 which engages the edge of the work table beyond the pull rollers 43 and 44. When the forming strips 103 are not in use to form the bead of FIG. 5, they are laterally moved to positions intermediate the edges and the center line of the work table (as shown on FIG. 8).

The method of operating the machine to form edge beads on thermo-plastic sheets will be understood from the above description, and the following procedure. A stack of plastic sheets 28 is placed on the feed table and arranged against the corner squaring block 31 and the side guides 32 and 33. The forming dies 56 are pre-heated.

The foot 111 of the feeder means is placed on the top sheet of the stack, with the lip 112 engaging the rear end edge of the sheet. The motor 52 operating the rollers is put in operation, and the piston and cylinder means of the feeder mechanism pulls the top sheet forward until its front end is engaged by the feed rollers 41 and 42, and the sheet passes through the forming dies and the pulling rollers 44 and 45 as indicated. When the trailing end of the sheet going through the dies passes the feeler roller 75, the limit switch is actuated to again put the feed means into operation to bring forward the second sheet on the stack.

The advantages of this automatic or semi-automatic machine will be understood from the above description. The objectives stated in the beginning have been attained.

I claim:

1. A machine for forming shaped beads on the edges of rectangular thermoplastic sheets comprising a work-table including a supporting frame, said work-table being adapted to support a plastic sheet flat-wise; edge-bead forming dies including heating means disposed adjacent the edges to be shaped and in opposed relation on opposite edges of said work-table, each of said dies having a plane working surface tilted inwardly at the top toward the center line of said work-table; means for moving the plastic sheets flat-wise on said table between said edge-bead forming dies; and lifting means disposed on the work-table adjacent said dies and arranged to press the edge portions of the plastic sheet upwardly against said dies.

2. A machine for forming shaped beads on the edges of rectangular thermoplastic sheets comprising a work-table including a supporting frame, said work-table being adapted to support a plastic sheet flatwise; edge-bead forming dies including heating means disposed adjacent the edges to be shaped and in opposed relation on opposite edges of said work-table, each of said dies having a plane working surface tilted inwardly at the top toward the longitudinal center line of said work-table; means for moving the plastic sheets flat-wise on said table between said edge-bead forming dies; lifting means disposed on the work-table adjacent said dies and arranged to press the edge portions of a plastic sheet upwardly against said dies; and a lifting pad disposed on said work-table down-stream from said dies and pulling rollers, adapted to elevate the center portion of the work sheet whereby to preserve the double bead formed on the edges of the sheet.

3. A machine for forming shaped beads on the edges of rectangular thermoplastic sheets comprising a work-table including a supporting frame, said work-table being adapted to support a plastic sheet flat-wise; edge-bead forming dies including heating means disposed adjacent the edges to be shaped and in opposed relation on opposite edges of said work-table, each of said dies having a plane working surface tilted inwardly at the top toward the longitudinal center line of said work-table; means for moving the plastic sheets flat-wise on said table between said edge-beard forming dies; lifting spring means disposed on the work-table adjacent said dies and arranged to press the edge portions of the plastic sheet upwardly against said dies; a lifting pad disposed on said work-table down-stream from said dies adapted to elevate the center portion of the work sheet, a spring pressed roller mounted on said frame over the table adapted to press down on the plastic sheet on said lifting pad; and reforming leaf springs adapted to press upwardly against the edges of the sheets down-stream from said dies, whereby to flatten the beads on the underside of said sheet of plastic.

4. A machine for forming shaped beads on the edges of rectangular thermoplastic sheets comprising a work-table including a supporting frame, said work-table being adapted to support a plastic sheet flat-wise, and having an opening extending thereacross intermediate the table ends; edge-bead forming dies including heating means disposed on opposite sides of said feed table adjacent said opening; a pair of superimposed compressible feed rollers extending across said work-table, said rollers being disposed in said opening ahead of said forming dies, and adapted to push a sheet of plastic between said edge-bead forming dies; a pair of superimposed compressible pulling rollers extending across the middle portion of said work-table, said rollers being disposed in said opening down-stream from said forming dies and adapted to pull a sheet of plastic while passing through said dies; and lifting means disposed across the space between said pairs of rollers arranged to press the plastic sheet being processed, upwardly against said dies.

5. A machine for forming shaped beads on the edges of rectangular thermoplastic sheets comprising a work-table including a supporting frame, said work-table being adapted to support a plastic sheet flat-wise, and having an opening extending thereacross intermediate the table ends; edge-bead forming dies including heating means disposed on opposite sides of said feed table adjacent said opening; each of said dies having a plane working surface tilted inwardly at the top toward the longitudinal centerline of said work-table; a pair of superimposed compressible feed rollers extending across said work-table, said rollers being disposed in said opening ahead of said forming dies, and adapted to push a sheet of plastic between said edge-bead forming dies; a pair of superimposed compressible pulling rollers extending across the middle portion of said work-table, said rollers being disposed in said opening down-stream from said forming dies and adapted to pull a sheet of plastic while passing through said dies; lifting means disposed on the work-table adjacent said dies and arranged to press the edge portions of a plastic sheet being edge-formed, upwardly against said dies; and a lifting pad disposed on said work-table down-stream from said dies and pulling rollers, adapted to elevate the center portion of the work sheet whereby to preserve the double bead formed on the edges of the sheet.

6. A machine for forming shaped beads on the edges of rectangular thermoplastic sheets comprising a work-table including a supporting frame, said work-table being adapted to support a plastic sheet flat-wise, and having an opening extending thereacross intermediate the table ends; edge-bead forming dies including heating means disposed adjacent the edges to be shaped and in opposed relation on opposite edges of said work-table, each of said dies having a plane working surface tilted inwardly at the top toward the longitudinal centerline of said work-table; a pair of superimposed compressible feed rollers extending across said work-table, said rollers being disposed in said opening ahead of said forming dies, and adapted to push a sheet of plastic between said edge-bead forming dies; a pair of super-imposed compressible pulling rollers extending across the middle portion of said work-table, said rollers being disposed in said opening down-stream from said forming dies and adapted to pull a sheet of plastic while passing through said dies; lifting means disposed across the face between said pairs of rollers arranged to press the plastic sheet being edge-formed, upwardly against said dies; a lifting pad disposed on said work-table down-stream from said dies adapted to elevate the center portion of the work sheet, a spring pressed roller mounted on said frame over the table adapted to press down on the plastic sheet on said lifting pad; and re-forming leaf springs adapted to press upwardly against the edges of the sheets down-stream from said dies, whereby to flatten the beads on the underside of said sheet of plastic.

7. A machine for forming shaped beads on the edges of rectangular thermoplastic sheets comprising a work-table including a supporting frame, said work-table being adapted to support a plastic sheet flat-wise; edge-bead forming dies including heating means disposed adjacent the edges to be shaped and in opposed relation on opposite edges of said work-table; and means for moving the plastic sheets flat-wise on said table between said edge-bead forming dies, a feed table arranged in longitudinal alignment with said work-table; automatic feeding means for sequentially advancing individual sheets from the top of a stack of plastic sheets on said feed table to said work-table comprising a supporting arm hingedly supported on said frame above said feed table and having its free end extended over the center line of the stack of plastic sheets to be edge-formed; a fluid actuated piston and cylinder means mounted on said arm; a vertically adjustable feed shoe pivotally attached to said piston and cylinder means at the free end of said arm for engaging the end of the top sheet on the stack; and reversing means for said piston and cylinder means.

8. In a machine for forming shaped beads on the edges of rectangular thermoplastic sheets as defined in claim 4, a feed table arranged in longitudinal alignment with said work-table; automatic feeding means for sequentially advancing individual sheets from the top of a stack of plastic sheets on said feed table to said work-table comprising a supporting arm hingedly supported on said frame above said feed table and having its free end extended over the center line of the stack of plastic sheets to be edge-formed; a fluid actuated piston and cylinder means mounted on said arm; a vertically adjustable feed shoe pivotally attached to said piston and cylinder means at the free end of said arm for engaging the end of the top sheet on the stack; and reversing means for said piston and cylinder means.

References Cited in the file of this patent

UNITED STATES PATENTS

| 2,958,901 | Molla | Nov. 8, 1960 |
| 2,994,361 | Gable et al | Aug. 1, 1961 |